(12) United States Patent
Lin (10) Patent No.: US 10,165,166 B2
(45) Date of Patent: Dec. 25, 2018

(54) CAMERA MODULE

(71) Applicants: LITE-ON ELECTRONICS (GUANGZHOU) LIMITED, Guangzhou (CN); Lite-On Technology Corporation, Taipei (TW)

(72) Inventor: Tsung-Yu Lin, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 3 days.

(21) Appl. No.: 15/597,160

(22) Filed: May 17, 2017

(65) Prior Publication Data

US 2018/0115688 A1 Apr. 26, 2018

(30) Foreign Application Priority Data

Oct. 26, 2016 (CN) .......................... 2016 1 0946242

(51) Int. Cl.
| | |
|---|---|
| *H04N 5/225* | (2006.01) |
| *G02B 5/20* | (2006.01) |
| *G02B 7/02* | (2006.01) |
| *G02B 7/09* | (2006.01) |
| *G02B 7/10* | (2006.01) |

(Continued)

(52) U.S. Cl.
CPC ........... *H04N 5/2254* (2013.01); *G02B 5/208* (2013.01); *G02B 7/021* (2013.01); *G02B 7/09* (2013.01); *G02B 7/102* (2013.01); *G02B 7/34* (2013.01); *G02B 9/04* (2013.01); *G02B 27/646* (2013.01); *H04N 5/2257* (2013.01); *H04N 5/23212* (2013.01); *H04N 5/23287* (2013.01)

(58) Field of Classification Search
CPC ............... H04N 5/2254; H04N 5/2257; H04N 5/23287; H04N 5/23212–5/232127; G03B 3/00; G03B 3/10; G03B 13/32–13/36; G02B 7/04–7/105; G02B 7/28–7/40; G02B 5/208

See application file for complete search history.

(56) References Cited

U.S. PATENT DOCUMENTS

| | | | |
|---|---|---|---|
| 2007/0285555 A1* | 12/2007 | Chen .................... | H04N 5/2253 348/340 |
| 2011/0001857 A1* | 1/2011 | Hwang ................ | H04N 5/2253 348/294 |

(Continued)

FOREIGN PATENT DOCUMENTS

| | | |
|---|---|---|
| JP | 2004302123 | 10/2004 |
| TW | 201535036 | 9/2015 |

*Primary Examiner* — Paul M Berardesca
(74) *Attorney, Agent, or Firm* — JCIPRNET (57) ABSTRACT

A camera module including a lens holder, a lens barrel, a first lens set, a second lens set, an image sensing component and a driver is provided. The lens barrel is disposed on the lens holder. The first lens set is disposed in the lens barrel. The second lens set is fixed in the lens holder. The first lens set and the second lens set include at least one lens respectively. The image sensing component is disposed in the lens holder. The driver is configured to drive the lens barrel to enable the first lens set to move along a direction parallel to an axis direction of the optical axis. The driver adjusts a position of the first lens set so as to form a gap between the first lens set and the second lens set and along the optical axis.

16 Claims, 5 Drawing Sheets

(51) Int. Cl.
  *G02B 27/64* (2006.01)
  *H04N 5/232* (2006.01)
  *G02B 9/04* (2006.01)
  *G02B 7/34* (2006.01)

(56) References Cited

U.S. PATENT DOCUMENTS

2015/0256727 A1   9/2015  Kim et al.
2016/0241787 A1*  8/2016  Sekimoto ............. H04N 5/2257
2016/0282580 A1*  9/2016  Koyama ................. G02B 7/08

* cited by examiner

CAMERA MODULE

CROSS-REFERENCE TO RELATED APPLICATION

This application claims the priority benefit of China application no. 201610946242.9, filed on Oct. 26, 2016. The entirety of the above-mentioned patent application is hereby incorporated by reference herein and made a part of this specification.

BACKGROUND OF THE INVENTION

1. Field of the Invention

The invention generally relates to a camera module.

2. Description of Related Art

Along with the progressing evolution and improvements of electronic technology and the manufacturing techniques thereof, information products are continuously upgraded. Electronic products such as computers, mobile phones and camera modules have become indispensable tools in life. In particular, the camera modules, which allow a user to record moments of daily life anytime and anywhere, have gained a significant popularization rate.

Generally, in the structure of the camera module, a lens set is disposed in a lens barrel and an infrared filter film is disposed between an image sensing component and the lens set. However, with such configuration, it is difficult to reduce the volume and the production cost of the camera module. Further, when a user uses the camera module to shoot an object, focusing is achieved through moving the lens set in the lens barrel. Nevertheless, an adjustment of image quality via the aforementioned approach has its limits such that the user is unable to further adjust and improve an optical quality of the image. Moreover, since the camera module achieves focusing through moving the lens set in the lens barrel, it is unable to effectively reduce a focus stroke, thereby resulting in a relatively slow focusing speed.

On the other hand, due to manufacturing or processing factors, an imaging surface of the image sensing component in the camera module often encounters a problem of warpage. In other words, the imaging surface of the image sensing component is not a perfect horizontal plane. Generally, when an external light beam incidents to the camera module, the lens set in the camera module images the external light beam on the horizontal plane. Thus, when the imaging surface of the image sensing component is not a horizontal plane, image qualities of the image sensed by a conventional camera module at different regions of the image sensing component are varied, thereby resulting in a poor image quality. Accordingly, how to resolve the aforesaid problems is substantially one of the major research and development issues for the relevant personnel.

SUMMARY OF THE INVENTION

The invention is directed to a camera module, which has a smaller volume and a favorable close-up shooting distance, capable of simultaneously adjusting an imaging and a focusing optical qualities of an image sensing component.

In one embodiment of the invention, a camera module comprising a lens holder, a lens barrel, a first lens set, a second lens set, an image sensing component and a driver is provided. The lens barrel is disposed on the lens holder. The first lens set is disposed in the lens barrel. The second lens set is fixed in the lens holder. The first lens set and the second lens set respectively include at least one lens. The image sensing component preferably shares an optical axis with the first lens set and the second lens set. The image sensing component is disposed in the lens holder. The driver is configured to drive the lens barrel to enable the first lens set to move along a direction parallel to an axis direction of the optical axis. The driver adjusts a position of the first lens set so as to form a gap between the first lens set and the second lens set and along the optical axis.

In one embodiment of the invention, the image sensing component has a curved imaging surface. The camera module further includes a controller. The controller is electrically connected to the driver. The controller controls the driver to adjust the position of the first lens set according to the image sensing component, so as to adjust the gap by enabling the first lens set to move a first distance relative to the second lens set.

In one embodiment of the invention, an external light beam after passing through the first lens set and the second lens set is imaged on an imaging surface of the image sensing component to enable the image sensing component to sense an image. The controller defines an optical characteristic function according to an optical characteristic of the image and a focal point of the first lens set and the second lens set with respect to the imaging surface. A curve calculated by the controller according to the optical characteristic function and a partial image being sensed corresponding to a first position of the imaging surface is a first optical characteristic function curve. The focal point corresponding to a peak value of the first optical characteristic function curve is a first focal point. A curve calculated by controller according to the optical characteristic function and a partial image being sensed corresponding to a second position of the imaging surface is a second optical characteristic function curve. The focal point corresponding to a peak value of the second optical characteristic function is a second focal point. The controller controls the driver to adjust the first lens set to move the first distance relative to the second lens set according to the image sensing component so as to make the first focal point and the second focal point to be different.

In one embodiment of the invention, the controller adjusts the gap according to a height difference between the first position of the imaging surface and the second position of the imaging surface of the image sensing component. The first position is different from the second position. The first focal point and the second focal point have a value of difference therebetween. The value of difference substantially equals the height difference.

In one embodiment of the invention, the optical characteristic function is a modulation transfer function.

In one embodiment of the invention, the controller further controls the drive to adjust the position of the first lens set according to a distance from an object to be captured to the camera module, so as to enable the first lens set to move a second distance relative to the second lens set. The second distance includes the first distance.

In one embodiment of the invention, the camera module further includes a protective cover. The lens barrel is located between the protective cover and the lens holder.

In one embodiment of the invention, the camera module further includes an infrared filter film. The protective cover has a first surface and a second surface opposite to each other. The second surface faces toward the lens barrel. The infrared filter film is disposed on a surface of any one lens in the first lens set and the second lens set or disposed on at least one of the first surface and the second surface of the protective cover.

In one embodiment of the invention, a material of the infrared filter film is a blue glass coating or a blue glass-like coating.

In one embodiment of the invention, the driver adjusts the position of the first lens set so as to make the first lens set move on a plane. A normal direction of the plane is parallel to the axis direction of the optical axis.

In one embodiment of the invention, the lens barrel further includes an optical image stabilizer. The first lens is fixed to the optical image stabilizer. The optical image stabilizer adjusts the position of the first lens set so as to make the first lens set move relative to the second lens set on a plane. A normal direction of the plane is parallel to the axis direction of the optical axis.

In one embodiment of the invention, the camera module further includes an infrared filter film. The infrared filter film is disposed between the first lens set and the second lens set.

In order to make the aforementioned and other features and advantages of the present application more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
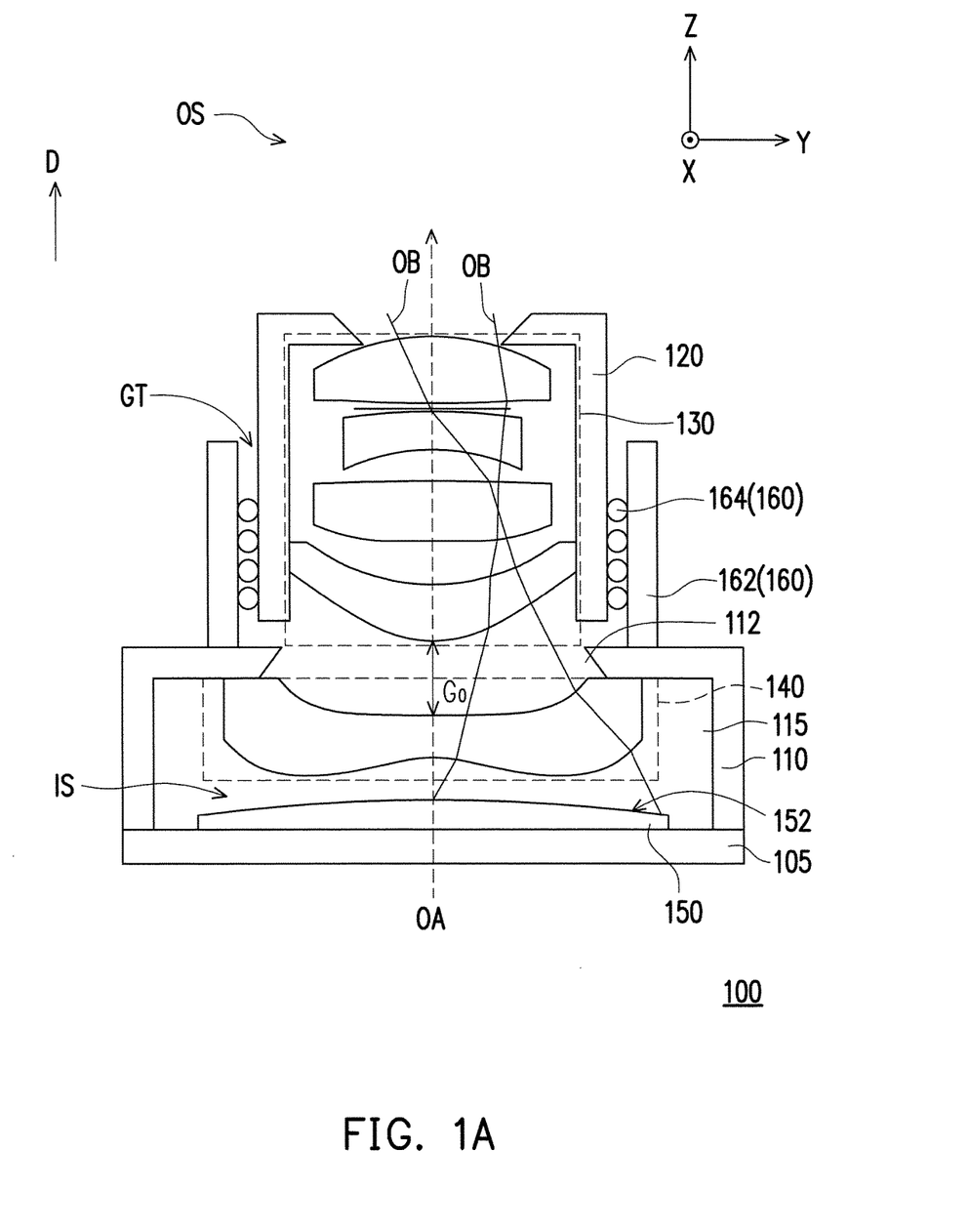
FIG. 1A is a cross-sectional schematic diagram illustrating a camera module, before adjusting a gap, according to an embodiment of the invention.
Figure 1B:
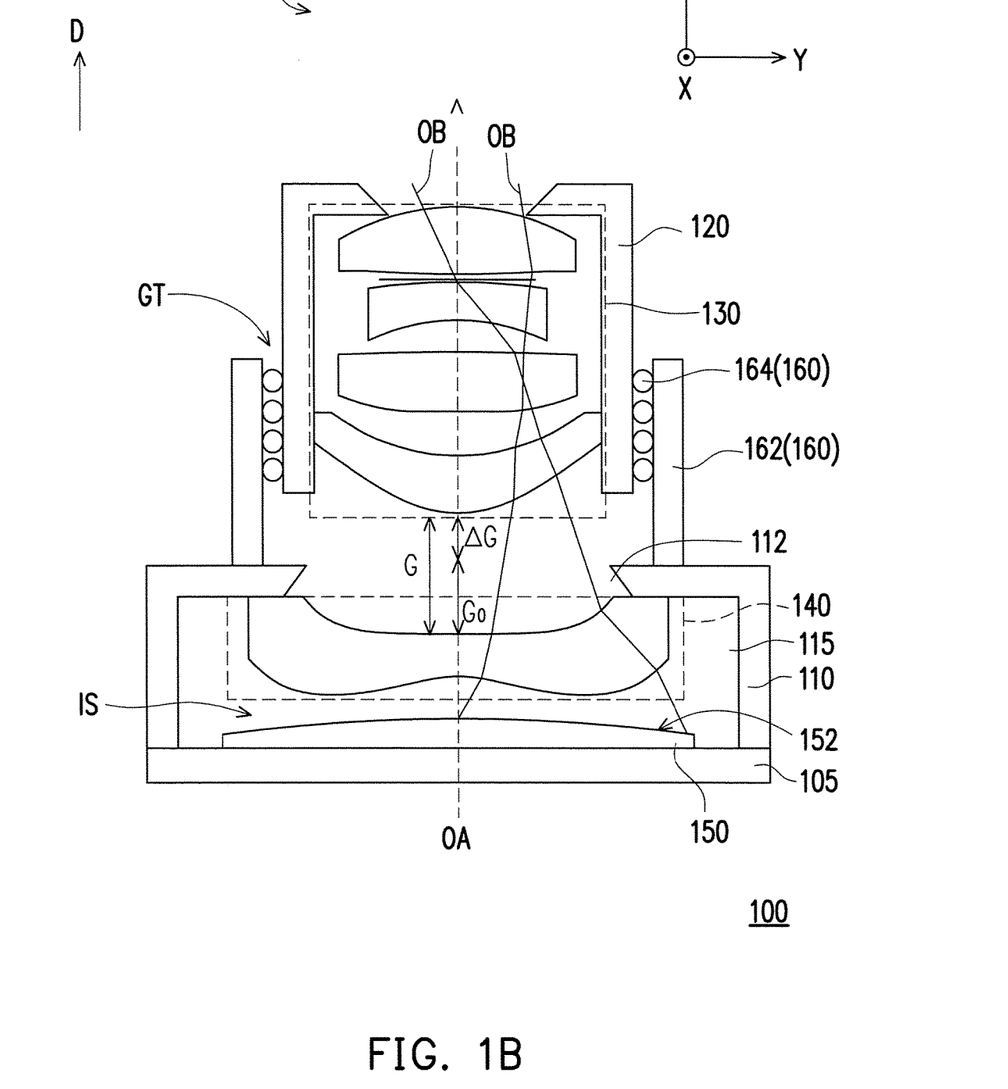
FIG. 1B is a cross-sectional schematic diagram illustrating the camera module of FIG. 1A, after adjusting the gap.

FIG. 1A is a cross-sectional schematic diagram illustrating a camera module, before adjusting a gap, according to an embodiment of the invention. FIG. 1B is a cross-sectional schematic diagram illustrating the camera module of FIG. 1A, after adjusting the gap.

Referring to FIG. 1A and FIG. 1B, in the present embodiment, a camera module 100 includes a lens holder 110, a lens barrel 120, a first lens set 130, a second lens set 140, an image sensing component 150, and a driver 160. The lens barrel 120 is disposed on the lens holder 110. The first lens set 130 is disposed in the lens barrel 120. The second lens set 140 is fixed in the lens holder 110. In the present embodiment, the second lens set 140 is fixed in an accommodation space 115 constituted by the lens holder 110 and the circuit board 105. In other embodiments, the second lens set 140 may be fixed at an opening 112 above the accommodation space 115, and the invention is not limited thereto. The first lens set 130 and the second lens set 140 respectively include at least one lens. The image sensing component 150 preferably shares an optical axis OA with the first lens set 130 and the second lens set 140. The image sensing component 150 is disposed on the circuit board 105, and electrically connected to the circuit board 105. The driver 160 is configured to drive the lens barrel 120 so as to enable the first lens set 130 to move along a direction (this direction is, for example, a direction D or an opposite direction of the direction D) parallel to an axis direction of the optical axis OA. Referring firstly to FIG. 1A, before the driver 160 adjusts a position of the first lens set 130, the second lens set 140 and the first lens set 130 have an initial gap $G_0$ along the optical axis OA. In other embodiments, before the driver 160 adjusts the position of the first lens set 130, the second lens set 140 and the first lens set 130 may, for example, be in contact with each other (namely, the initial gap $G_0$ being zero), and the invention is not limited to the initial relative positions of the first lens set 130 and the second lens set 140. Next, referring to FIG. 1B, the driver 160 adjusts the position of the first lens set 130 so as to enable a gap G to be formed along the optical axis OA and between the first lens set 130 and the second lens set 140. Specifically, the driver 160, for example, drives the lens barrel 120 to move a distance $\Delta G$ along the direction D, and the gap G is, for example, the initial gap $G_0$ plus the distance $\Delta G$. The second lens set 140 covers the opening 112 of the accommodation space 115 and thereby has a dustproof effect.

More specifically, in the present embodiment, the driver 160 is, for example, a ball-type motor. A casing 162 of the driver 160 has a guiding tunnel GT. The lens barrel 120 is disposed in the guiding tunnel GT. The driver 160 further includes a ball-type guide element 164, and the ball-type guide element 164 is disposed between the casing 162 and the lens barrel 120. In more details, when the driver 160 drives the lens barrel 120 to move along the D direction parallel to the axis direction of the optical axis OA, the lens barrel 120 can be guided by the ball-type guide element 164 to move in the guiding tunnel GT. In other embodiments, the driver 160 may also be a voice coil motor (VCM) or a stepper motor, and the invention is not limited thereto. Moreover, in the present embodiment, the image sensing component 150 is, for example, a complementary metal oxide semiconductor (CMOS) or a charge coupled device (CCD), and the invention is not limited thereto.

An implementation of the first lens set 130 and the second lens set 140 is provided in the following for an example, but the invention is not limited thereto. In the present embodiment, the first lens set 130, for example, includes four lenses s (i.e., a four-piece lens set) arranged from an object-side OS to an image-side IS along the optical axis OA. The second lens set 140 is, for example, a one-piece lens set. In other embodiments, the number of the lens in the first lens set 130 may also be one, and the number of the lens in the second lens set 140 may also be at least two; in other words, the number of the lens in each of the first lens set 130 and the second lens set 140 of the present embodiment is at least one lens being present and can be designed according to the needs and is not limited to the number shown in FIG. 1A and FIG. 1B.

In view of the above, as compared to a conventional camera module, the camera module 100 of the present embodiment enables a volume of the lens barrel 120 to be reduced by disposing the first lens set 130 in the lens barrel 120 and fixing the second lens set 140 in the lens holder 110, and enables the camera module 100 to have a smaller overall volume through utilizing a space in the lens holder 110. Also, as compared to the conventional camera module, with the aforesaid configuration, when the camera module 100 of the present embodiment performs focusing, only the first lens set 130 is required to be moved for attaining focusing, and thereby effectively reduces a focus stroke and accelerates a focusing speed; and, under a same focus stroke, the camera module 100 of the present embodiment can obtain a more favorable close-up shooting distance.

In the present embodiment, the camera module 100 further includes an infrared filter film (IR cut filter, not shown). The infrared filter film is, for example, disposed on a surface of any one lens in the first lens set 130 and the second lens set 140 by means of coating, but the invention is not limited thereto. To this end, the infrared filter film can be a blue glass coating or a blue glass-like coating, i.e. an optical coating functioning as blue glass. Therefore, as compared to the conventional camera module, the camera module 100 of the present embodiment lowers the production costs by eliminating an additional and separate infrared cut-off filter. Preferably, the infrared filter film can be deposited on a surface of a lens having relatively small curvature in the first lens set 130 or the second lens set 140, so that the image quality of the camera module 100 can be enhanced as the flatness of the coated lens affects the image quality. In an embodiment, if a surface of any lens in the first lens set 130 and the second lens set 140 is not, for example, coated with the infrared filter film, a material of any lens in the camera module 100 can be replaced with blue glass, and thus the blue glass lens per se provides a function of blocking infrared wavelengths. In other embodiments, the infrared filter film can be disposed between the first lens set 130 and the second lens set 140, and then the manufacturing process of the camera module (not shown) is simplified compared with the coated lens or blue glass lens.

Figure 2A:
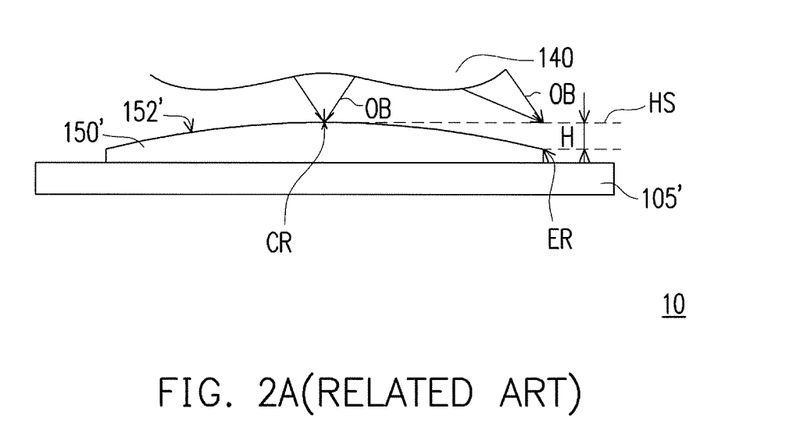
FIG. 2A is an enlarged schematic diagram illustrating an optical imaging of a conventional camera module on a surface of an image sensing component thereof.
Figure 2B:
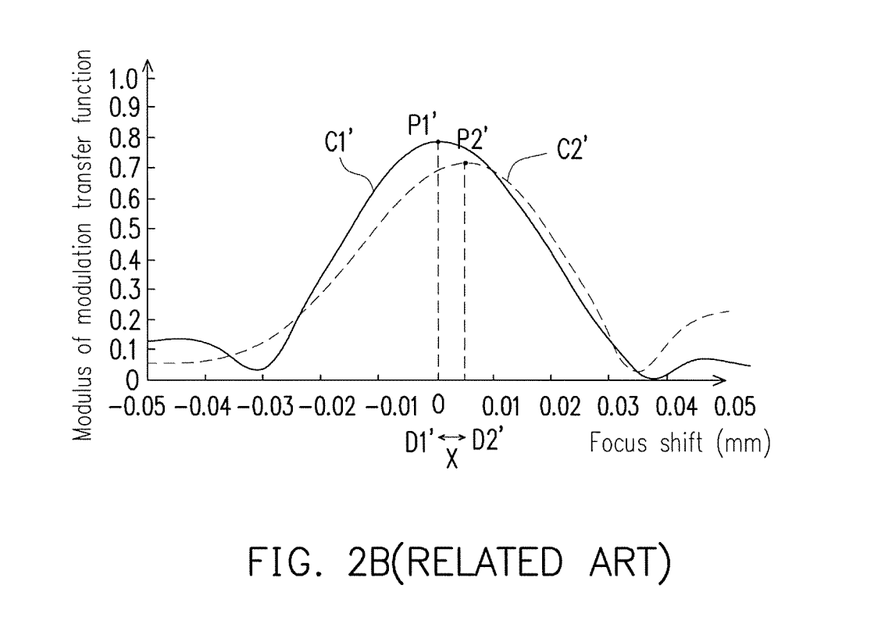
FIG. 2B is a diagram illustrating modulation transfer function curves of the conventional camera module of FIG. 2A at a central region and an edge region of the imaging surface.
Figure 2C:
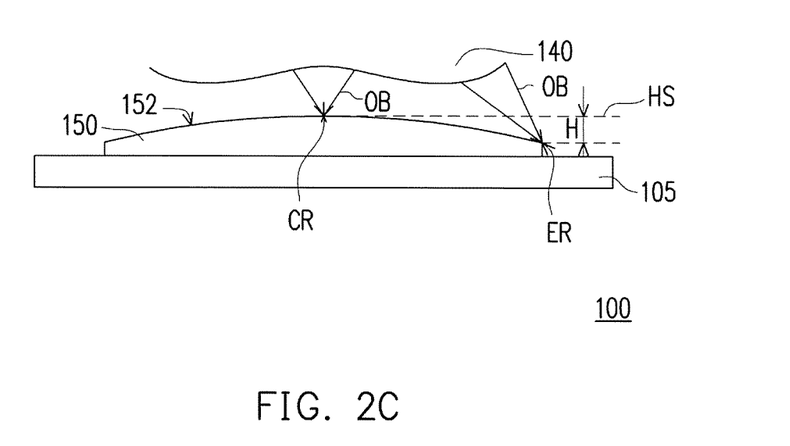
FIG. 2C is an enlarged schematic diagram illustrating an optical imaging of the camera module of FIG. 1B on a surface of an image sensing component thereof.
Figure 2D:
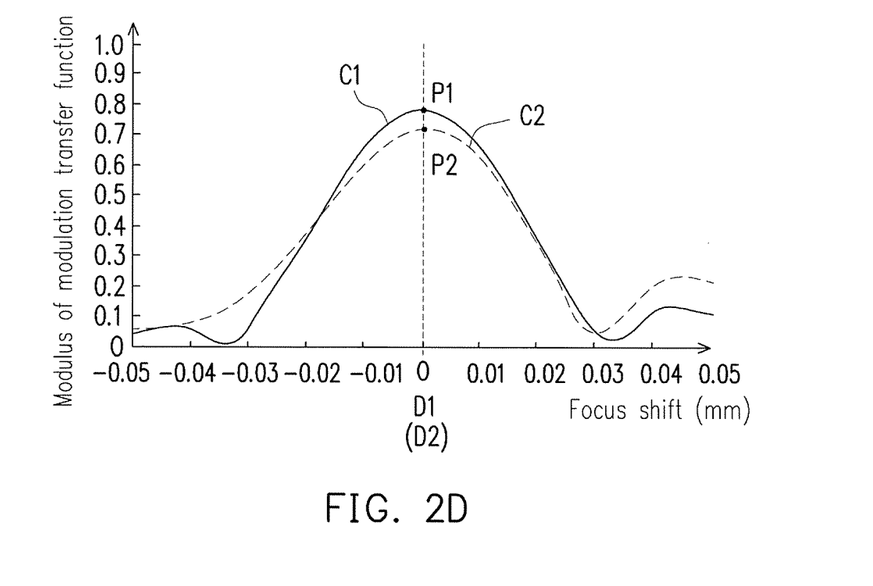
FIG. 2D is a diagram illustrating modulation transfer function curves of the camera module of FIG. 1B at a central region and an edge region of the imaging surface.

FIG. 2A is an enlarged schematic diagram illustrating an optical imaging of a conventional camera module on a surface of an image sensing component thereof, wherein the conventional camera module does not have the first lens set 130 being movably disposed in the lens barrel 120 and the second lens set 140 being fixed in the lens holder 110 as set forth in the present invention. FIG. 2B is a diagram illustrating modulation transfer function (MTF) curves of the conventional camera module of FIG. 2A at a central region and an edge region of the imaging surface. FIG. 2C is an enlarged schematic diagram illustrating an optical imaging of the camera module of FIG. 1B on a surface of an image sensing component thereof. FIG. 2D is a diagram illustrating MTF curves of the camera module of FIG. 1B at a central region and an edge region of the imaging surface. The horizontal axis in FIG. 2B and FIG. 2D is focus shift, and the vertical axis in FIG. 2B and FIG. 2D is modulus of the MTF.

Referring to FIG. 2A and FIG. 2C at the same time, in the conventional camera module 10 or in the camera module 100 of the present embodiment of the invention, an imaging surface 152' or 152 of the image sensing component 150' or 150 is not a perfect horizontal plane. Substantially, due to a factor such as a material of the image sensing component 150' or 150, a glue shrinkage between the image sensing component 150' or 150 and a substrate, or the substrate being uneven, the imaging surface 152' or 152 of the image sensing component 150' or 150 appears to have certain degree of warpage, instead of being a perfect horizontal plane. Therefore, a height difference H is between a central region CR of the imaging surface 152' or 152 in relation to a bottom surface of the image sensing component 150' or 150 and an edge region ER of the imaging surface 152' or 152 in relation to the bottom surface of the image sensing component 150' or 150. Since the conventional camera module 10 cannot resolve the warping problem of the surface 152' of the image sensing component 150', under a general focusing situation, when an external light beam OB is incident to the conventional camera module 10, a lens set LS of the conventional camera module 10 images the external light beam OB on a horizontal plane HS. In other words, in the conventional camera module 10, a portion of the external light beam OB is, for example, imaged at the central region CR of the surface 152' while a portion of the external light beam OB is, for example, imaged at a position far away from and above the edge region ER of the surface 152' with a height difference H.

Referring to FIG. 2B again, the conventional camera module 10 further includes a controller (not shown), and the controller defines a MTF according to an image sensed by the image sensing component 150', an optical characteristic of the image and a focal point of the lens set LS with respect to the surface 152'. A curve calculated by the controller according to the MTF and a partial image being sensed corresponding to the central region CR of the surface 152' is a first MTF curve C1', and the focal point corresponding to a peak value Pr of the first MTF curve C1' is a focal point D1'. A curve calculated by the controller according to the MTF and a partial image being sensed corresponding to the edge region ER of the surface 152' is a second MTF curve C2', and the focal point corresponding to a peak value P2' of the second MTF curve C2' is a focal point D2'. Since the conventional camera module 10 enables the external light beam OB to be imaged on the horizontal plane HS, in FIG. 2A, a part of the external light beam OB is able to be successfully focused at the central region CR of the surface 152', but the other part of the external light beam OB is unable to be successfully focused at the edge region ER of the surface 152'. As shown in FIG. 2B, there is a shift distance in an abscissa axis between the peak value P1' of the MTF curve C1' and the peak value P2' of the MTF curve C2', and thus the focal point D2' has a focus shift X with respect to the focal point D1'. From this perspective, conventional camera module 10, results in a quality difference of the image sensed at different regions of the surface 152'.

Comparatively, referring to FIG. 1B, FIG. 2C and FIG. 2D, in the present embodiment, the driver 160 adjusts a position of the first lens set 130 so as to form a gap G along the optical axis OA and between the first lens set 130 and the second lens set 140, and thereby is capable of adjusting an optical quality of the image sensed by the camera module 100 or performing focusing. Specifically, with a fixed object distance, a user can change the size of the gap G through using the driver 160 so as to adjust the optical quality of the image, and the optical quality is, for example, a through focus, a field curvature or etc., but the invention is not limited thereto. When the object distance is changed, the user can adjust the size of the gap G through using the driver 160 so as to attain focusing, and simultaneously to adjust the optical quality of the image after the focusing.

More specifically, as shown in FIG. 1A and FIG. 1B, the imaging surface 152 of the image sensing component 150 is curved. Referring to FIG. 1B, FIG. 2C and FIG. 2D again, the camera module 100 includes a controller (not shown).

The controller is electrically connected to the driver 160 and the image sensing component 150. The controller controls the driver 160 to adjust the position of the first lens set 130 according to a degree of curvature of the imaging surface 152 of the image sensing component 150, so as to adjust the gap G by enabling the first lens set 130 to move a first distance relative to the second lens set 140. Specifically, after passing through the first lens set 130 and the second lens set 140, the external light beam OB is imaged on the imaging surface 152 so as to enable the image sensing component 150 to sense an image. In more details, in the present embodiment, the external light beam OB is incident to the lens barrel 120, sequentially passes through the first lens set 130, enters the lens holder 110, passes through the second lens set 140 and finally is imaged on the imaging surface 152 of the image sensing component 150, so as to enable the image sensing component 150 to sense the image. The controller defines an optical characteristic function according to an optical characteristic of the image and focal points of the first lens set 130 and the second lens set 140 with respect to the imaging surface 152, and an implementation of the optical characteristic function is, for example, a MTF, but the invention is not limited thereto. In the present embodiment, the optical characteristic of the image is, for example, a through focus. In other embodiments, the optical characteristic of the image may, for example, be a field curvature, and the invention is not limited thereto. A curve calculated by the controller according to the MTF and a partial image being sensed corresponding to a first position (e.g., a central region CR) of the imaging surface 152 is a first optical characteristic function curve C1, and the focal point corresponding to a peak value P1 of the first optical characteristic function curve C1 is a first focal point D1. A curve calculated by the controller according to the MTF and a partial image being sensed corresponding to a second position (e.g., an edge region ER) of the imaging surface 152 is a second optical characteristic function curve C2, and the focal point corresponding to a peak value P2 of the second optical characteristic function C2 is a second focal point D2. In other embodiments, the first position may also be a position other than the central region CR and the second position may also be a position other than the edge region ER, and the invention is not limited thereto.

Next, referring to FIG. 2C and the FIG. 2D again, the controller adjusts the gap G to make the first focal point D1 and the second focal point D2 be on the imaging surface 152. In other words, the controller adjusts the gap G to make the focus shift between the first focal point D1 and the second focal point D2 trend to substantially be 0; that is, to make the value in the abscissa axis corresponding to the first focal point D1 to be, for example, substantially equal to the value in the abscissa axis corresponding to the second focal point D2 in the FIG. 2D. More specifically, the controller adjusts the gap G according to a height difference H between the first position (e.g., the central region CR) of the imaging surface 152 and the second position (e.g., the edge region ER) of the imaging surface 152, so as to make a value of difference X between the first focal point D1 and the second focal point D2 to be or almost be the same as the height difference H between the central region CR of the imaging surface 152 and the edge region ER of the imaging surface 152. It can be known from FIG. 2C that, after adjusting the gap G, the external light beam OB at the edge region ER can be focused onto the imaging surface 152, and thus an image quality being sensed corresponding to the edge region ER can be improved after adjusting the gap G. As a result, as compared to the conventional camera module 10, the camera module 100 of the present embodiment can resolve the warping problem of the imaging surface 152 of the image sensing component 150 due to various reasons through adjusting the gap G between the first lens set 130 and the second lens set 140, and thereby further adjust the optical quality of the image to increase an optical quality adjustability. Moreover, the controller of the camera module 100 of the present embodiment adjusts the gap G to make the first focal point D1 and the second focal point D2 be on the imaging surface 152, so that the image qualities of the image sensed at different regions of the imaging surface 152 can be more uniform and favorable.

In view of the above, please refer to a Table 1 shown below:

|  | First case | Second case | Third case |
|---|---|---|---|
| A distance from an object to be captured (not shown) to the camera module 100 | Infinitely far away | 60 (mm) | 10 (mm) |
| A distance required to move the first lens set 130 due to the camera module 100 automatically focusing on the object to be captured | 0 | 100 (μm) | 150 (μm) |
| A distance required to move the first lens set 130 due to the imaging surface 152 being curved (i.e., the first distance) | 10 (μm) | 10 (μm) | 10 (μm) |
| A total distance ΔG required to move the first lens set 130 (i.e., the second distance) | $\Delta G_1 = 10$ (μm) | $\Delta G_2 = 110$ (μm) | $\Delta G_3 = 160$ (μm) |
| A gap G between the first lens set 130 and the second lens set 140 ($G_0$ is an initial gap) | $G_1 = G_0 + \Delta G_1$ | $G_2 = G_0 + \Delta G_2$ | $G_3 = G_0 + \Delta G_3$ |

Table 1 above is provided as examples for illustrating a total distance required to move the first lens set 130 (i.e., the distance ΔG in FIG. 1B, or the second distance) when the camera module 100 is to be focused on an object to be captured at different distances. Specifically, the total distance required to move the first lens set 130 equals to a sum of a distance required to move the first lens set 130 due to the camera module 100 automatically focusing on the object to be captured and a distance required to move the first lens set 130 (i.e., the first distance) due to the imaging surface 152 of the image sensing component 150 being curved. The distance required to move the first lens set 130 due to the camera module 100 automatically focusing on the object to be captured is determined according to a distance between the object to be captured and the camera module 100. The distance required to move the first lens set 130 due to the imaging surface 152 being curved is determined according to a degree of curvature of the imaging surface 152 of the image sensing component 150. Referring to FIG. 2C, FIG. 2D and the Table 1 above at the same time, in details, under the first case, the distance required to move the first lens set 130 due to the camera module 100 automatically focusing on the object to be captured is zero; and at this time, the distance required to move the first lens set 130 (i.e., the first distance) due to the imaging surface 152 being curved is 10 μm. Thus, under the first case, the controller controls the driver 160 to adjust the position of the first lens set 130 according to the degree of curvature of the imaging surface 152 of the image sensing component 152, so as to enable the first lens set 130 to move a first distance $\Delta G_1$ relative to the second lens set 140 (namely, to form the gap G), and thereby adjusts an optical quality of the imaged sensed by the image sensing component. That is to say, under the first case, the distance required to move the first lens set 130 is 10 μm (i.e., the distance ΔG in FIG. 1B or $ΔG_1$ in Table 1). On the other hand, under the second case and the third case, the controller further controls the driver 160 to adjust the positions of the first lens set 130 according to different distances from the object to be captured to the camera module 100. For these two cases, the distances required to move the first lens set 130 due to the camera module 100 automatically focusing on the object to be captured are respectively 100 μm and 150 μm, the distances required to move the first lens set 130 (i.e., the first distances) due to the imaging surface 152 being curved are both 10 and thus the total distances required to move the first lens set 130 (i.e., the distances ΔG in FIG. 1B or the second distances) are respectively 110 μm (i.e., $ΔG_2$ in Table 1) and 160 μm (i.e., $ΔG_3$ in Table 1). The distance required to move the first lens set 130 due to the imaging surface 152 being curved may be memorized by the controller in the camera module 100. When the user is to shoot the object to be captured at different distances through using the camera module 100, the controller can automatically add the distance required to move the first lens set 130 due to the camera module 100 automatically focusing on the object to be captured with the distance required to move the first lens set 130 due to the imaging surface 152 being curved, and then the controller can control the driver 160 to adjust the position of the first lens set 130 according to the total distance required to move the first lens set 130. As a result, the camera module 100 of the present embodiment, through using the aforementioned control method, enables the controller to precisely position the first lens set 130 with a single adjustment while simultaneously attaining focusing and achieving the effect of adjusting the optical quality. In comparison, the conventional camera module 10 is greatly limited in its image quality due to not taking a warpage factor of the imaging surface 152' into consideration. Besides, when the degree of curvature of the imaging surface 152 of the image sensing component 150 is changed, the distance required to move the first lens set 130 can further be adjusted.

It is noted that the camera module 100 may adjust a position of the first lens set 130 by the driver 160, so that the first lens set 130 can be adjusted its position relative to the second lens set 140 in an X-Y plane. In other words, the first lens set 130 can be moved not only along a direction of a Z axis but also the X-Y plane. In the embodiment, an active alignment machine (not shown) carries the driver 160 to drive the first lens set 130 which is not fixed yet at first to perform an X-Y plane movement relative to the second lens set 140. After the first lens set 130 is driven to a predetermined position in the X-Y plane to achieve an initial active alignment, the first lens set 130 is then fixed. In another embodiment, the lens barrel 120 may be equipped with an optical image stabilizer (i.e. OIS, not shown), and the first lens set 130 is fixed to the OIS. The OIS may drive the first lens set 130 to perform an X-Y plane movement relative to the second lens set 140. Then, the first lens set 130 is driven to a predetermined position in the X-Y plane so as to achieve an active alignment.

Therefore, the camera module 100 in the present embodiment can achieve an effect of active alignment via the above-mentioned adjustment way to solve an issue that optical axes are not consistent when the lens sets are assembled together (i.e. eccentric assembly).

It is to be explained that, the following embodiment has adopted component notations and part of the contents from the previous embodiment, wherein the same notations are used for representing the same or similar components, and descriptions of the same technical contents are omitted. The descriptions regarding the omitted part may be referred to the previous embodiments, and thus are not repeated herein.

Figure 3:
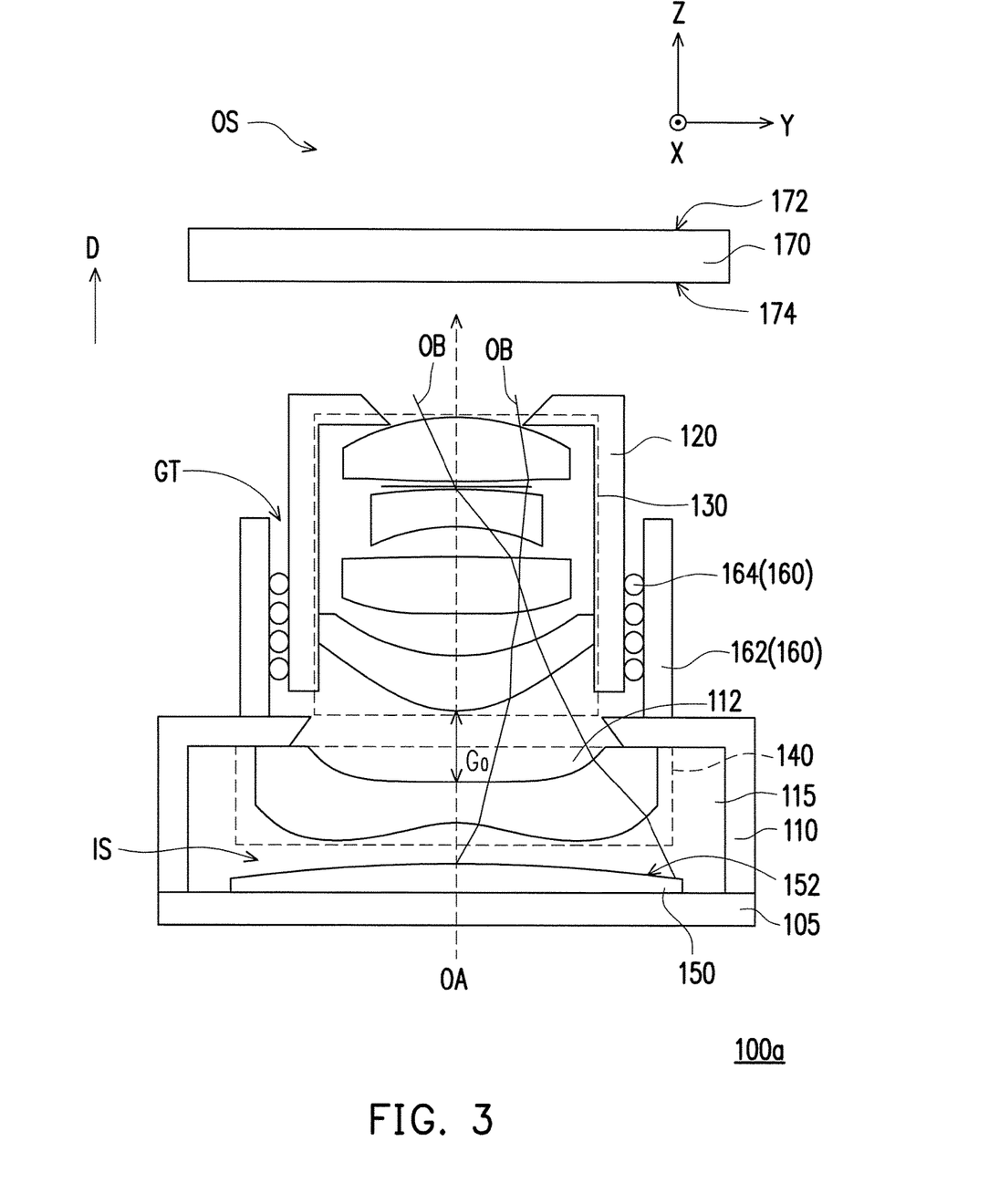
FIG. 3 is a cross-sectional schematic diagram illustrating a camera module according to another embodiment of the invention.

FIG. 3 is a cross-sectional schematic diagram illustrating a camera module according to another embodiment of the invention.

Referring to FIG. 3, a camera module 100a of FIG. 3 is similar to the camera module 100 of FIG. 1A and FIG. 1B, and a main difference therebetween lies in that the camera module 100a further includes a protective cover 170 (Cover Glass). A material of the protective cover 170 is, for example, glass or blue glass. The lens barrel 120 is located between the protective cover 170 and the lens holder 110. The protective cover 170 is configured to protect any one lens in the first lens set 130 and the second lens set 140, so as to prevent dust of the outside from falling on lens surfaces and influencing the image quality of the camera module 100a. The protective cover 170 has a first surface 172 and a second surface 174 opposite to each other. The first surface 172 faces toward outside, and the second surface 174 faces toward the lens barrel 120. In the present embodiment, the camera module 100a further includes an infrared filter film (not shown). The infrared filter film is, for example, disposed on at least one of the first surface 172 and the second surface 174, but the invention is not limited thereto.

In summary, the camera module in the embodiments of the invention disposes the first lens set in the lens barrel and fixes the second lens set in the lens holder so that the camera module in the embodiments of the invention can effectively use the space in the lens holder, thereby resulting in a smaller overall volume. Furthermore, with the aforesaid configuration, when the camera module in the embodiments of the invention performs focusing, only the first lens set is required to be moved for attaining focusing, and thereby effectively reduces a focus stroke and can obtain a more favorable close-up shooting distance. In addition, the camera module in the embodiments of the invention can adjust the optical quality of the image through adjusting the gap between the first lens set and the second lens set so as to increase the optical quality adjustability. Moreover, the controller of the camera module in the embodiments of the invention adjusts the gap to make the first focal point and the second focal point be on the imaging surface, so that the image qualities of the image sensed at different regions of the imaging surface can be more uniform and favorable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A camera module, comprising:
   a lens holder;
   a lens barrel, disposed on the lens holder;
   a first lens set, disposed in the lens barrel;
   a second lens set, fixed within the lens holder, wherein the first lens set and the second lens set respectively comprise at least one lens;
   an image sensing component, disposed on a circuit board;
   a driver, configured to drive the lens barrel to enable the first lens set to move along a direction parallel to an axis direction of the optical axis; and
   a controller, electrically connected to the driver, wherein the driver adjusts a position of the first lens set so as to form a gap between the first lens set and the second lens set and along the optical axis, wherein the controller controls the driver to adjust the position of the first lens set according to a first position and a second position of the imaging surface of the image sensing component, so as to adjust the gap by enabling the first lens set to move a first distance relative to the second lens set, and a height difference exists between the first position and the second position.

2. The camera module as recited in claim 1, wherein an external light beam after passing through the first lens set and the second lens set is imaged on an imaging surface of the image sensing component to enable the image sensing component to sense an image, the controller defines an optical characteristic function according to an optical characteristic of the image and a focal point of the first lens set and the second lens set with respect to the imaging surface, a curve calculated by the controller according to the optical characteristic function and a partial image being sensed corresponding to the first position of the imaging surface is a first optical characteristic function curve, the focal point corresponding to a peak value of the first optical characteristic function curve is a first focal point, a curve calculated by controller according to the optical characteristic function and a partial image being sensed corresponding to the second position of the imaging surface is a second optical characteristic function curve, and the focal point corresponding to a peak value of the second optical characteristic function is a second focal point, wherein the controller controls the driver to adjust the first lens set to move the first distance relative to the second lens set according to the image sensing component so as to make the first focal point the second focal point to be on the imaging surface.

3. The camera module as recited in claim 2, wherein the controller adjusts the gap according to a height difference between the first position of the imaging surface and the second position of the imaging surface of the image sensing component, and the first position is different from the second position, wherein the first focal point and the second focal point have a value of difference therebetween, and the value of difference substantially equals to the height difference.

4. The camera module as recited in claim 2, wherein the optical characteristic function is a modulation transfer function.

5. The camera module as recited in claim 1, wherein the controller further controls the driver to adjust the position of the first lens set according to a distance from an object to be captured to the camera module, so as to enable the first lens set to move a second distance relative to the second lens set, wherein the second distance includes the first distance.

6. The camera module as recited in claim 1, further comprising a protective cover, wherein the lens barrel is located between the protective cover and the lens holder, the protective cover has a first surface and a second surface opposite to each other, and the second surface faces toward the lens barrel.

7. The camera module as recited in claim 6, further comprising an infrared filter film, wherein the infrared filter film is disposed on a surface of any one lens in the first lens set and the second lens set or disposed on at least one of the first surface and the second surface of the protective cover.

8. The camera module as recited in claim 7, wherein a material of the infrared filter film is a blue glass coating or a blue glass-like coating.

9. The camera module as recited in claim 1, wherein the driver further adjusts the position of the first lens set so as to make the first lens set move relative to the second lens set on a plane, wherein a normal direction of the plane is parallel to the axis direction of the optical axis.

10. The camera module as recited in claim 1, wherein the lens barrel further comprising an optical image stabilizer, the first lens is fixed to the optical image stabilizer, wherein the optical image stabilizer adjusts the position of the first lens set so as to make the first lens set move relative to the second lens set on a plane, wherein a normal direction of the plane is parallel to the axis direction of the optical axis.

11. The camera module as recited in claim 1, further comprising an infrared filter film disposed between the first lens set and the second lens set.

12. The camera module as recited in claim 2, wherein the value in an abscissa axis of the first optical characteristic function curve corresponding to the first focal point is substantially equal to the value in an abscissa axis of the second optical characteristic function curve corresponding to the second focal point.

13. A camera module, comprising:
a lens holder;
a lens barrel, disposed on the lens holder;
a first lens set, disposed in the lens barrel;
a second lens set, fixedly disposed below the first lens set, wherein the first lens set and the second lens set respectively comprise at least one lens;
an image sensing component, disposed on a circuit board;
a driver, configured to drive the lens barrel to enable the first lens set to move along a direction parallel to an axis direction of the optical axis,
wherein the driver adjusts a position of the first lens set so as to form a gap between the first lens set and the second lens set and along the optical axis; and
wherein an external light beam after passing through the first lens set and the second lens set is imaged on an imaging surface of the image sensing component to enable the image sensing component to sense an image, an optical characteristic function is defined according to an optical characteristic of the image and a focal point of the first lens set and the second lens set with respect to the imaging surface,
a curve obtained according to the optical characteristic function and a partial image being sensed corresponding to a first position of the imaging surface is a first optical characteristic function curve, the focal point corresponding to a peak value of the first optical characteristic function curve is a first focal point,
a curve obtained according to the optical characteristic function and a partial image being sensed corresponding to a second position of the imaging surface is a second optical characteristic function curve, and the focal point corresponding to a peak value of the second optical characteristic function is a second focal point,
the first position and the second position are respectively located on different horizontal planes,
wherein the first focal point and the second focal point are on the imaging surface.

14. The camera module as recited in claim 13, wherein the value in an abscissa axis of the first optical characteristic function curve corresponding to the first focal point is substantially equal to the value in an abscissa axis of the second optical characteristic function curve corresponding to the second focal point.

15. A camera module, comprising:
a lens holder;
a lens barrel, disposed on the lens holder;
a first lens set, disposed in the lens barrel;
a second lens set, fixedly disposed below the first lens set, wherein the first lens set and the second lens set respectively comprise at least one lens;
an image sensing component, disposed on a circuit board;
a driver, configured to drive the lens barrel to enable the first lens set to move along a direction parallel to an axis direction of the optical axis,
wherein the driver adjusts a position of the first lens set so as to form a gap between the first lens set and the second lens set and along the optical axis; and
wherein an external light beam after passing through the first lens set and the second lens set is imaged on an imaging surface of the image sensing component to enable the image sensing component to sense an image, an optical characteristic function is defined according to an optical characteristic of the image and a focal point of the first lens set and the second lens set with respect to the imaging surface,
a curve obtained according to the optical characteristic function and a partial image being sensed corresponding to a first position of the imaging surface is a first optical characteristic function curve, the focal point corresponding to a peak value of the first optical characteristic function curve is a first focal point,
a curve obtained according to the optical characteristic function and a partial image being sensed corresponding to a second position of the imaging surface is a second optical characteristic function curve, and the focal point corresponding to a peak value of the second optical characteristic function is a second focal point,
the first position is different from the second position, and a height difference exists between the first position and the second position,
wherein the external light beam is focused at the first position and the second position of the imaging surface.

16. The camera module as recited in claim 15, wherein the value in an abscissa axis of the first optical characteristic function curve corresponding to the first focal point is substantially equal to the value in an abscissa axis of the second optical characteristic function curve corresponding to the second focal point.

* * * * *